United States Patent [19]
Brown et al.

[11] Patent Number: 6,124,036
[45] Date of Patent: Sep. 26, 2000

[54] AQUEOUS COLORANT COMPOSITION IN WATER-SOLUBLE PACKAGE

[75] Inventors: Steven Eugene Brown, Spartanburg, S.C.; Bruce Harlan Suddeth, Columbus, N.C.

[73] Assignee: Milliken & Company, Spartanburg, S.C.

[21] Appl. No.: 08/103,471

[22] Filed: Aug. 6, 1993

[51] Int. Cl.$^7$ ...................................................... B32B 27/38
[52] U.S. Cl. ............................................ 428/413; 428/913
[58] Field of Search ................................. 428/500, 913, 428/35.1, 413

[56] References Cited

U.S. PATENT DOCUMENTS

| | | | |
|---|---|---|---|
| 2,580,683 | 1/1952 | Kreuger | 99/165 |
| 2,667,268 | 1/1954 | Griffin | 206/84 |
| 2,780,355 | 2/1957 | Palermo et al. | 206/84 |
| 3,277,009 | 10/1966 | Freifeld et al. | 252/90 |
| 3,528,925 | 9/1970 | Chapuis | 252/161 |
| 3,790,067 | 2/1974 | Scheier | 229/55 |
| 3,875,449 | 4/1975 | Byler et al. | 313/466 |
| 4,098,728 | 7/1978 | Rosenblatt | 521/141 |
| 4,113,721 | 9/1978 | Hauser et al. | 260/178 |
| 4,141,684 | 2/1979 | Kuhn | 8/39 |
| 4,144,028 | 3/1979 | Hauser et al. | 8/164 |
| 4,167,510 | 9/1979 | Brendle | 260/174 |
| 4,289,815 | 9/1981 | Lee | 428/35 |
| 4,356,099 | 10/1982 | Davies et al. | 252/90 |
| 4,363,840 | 12/1982 | Roullet et al. | 428/35 |
| 4,416,791 | 11/1983 | Haq | 252/90 |
| 4,601,725 | 7/1986 | Keller et al. | 8/403 |
| 4,686,547 | 8/1987 | Hayashi et al. | 503/207 |
| 4,747,976 | 5/1988 | Yang et al. | 252/90 |
| 4,846,992 | 7/1989 | Fonsny | 252/90 |
| 4,871,371 | 10/1989 | Harris | 8/403 |
| 4,885,105 | 12/1989 | Yang et al. | 252/90 |
| 4,972,017 | 11/1990 | Smith et al. | 524/46 |
| 4,973,416 | 11/1990 | Kennedy | 252/90 |
| 4,981,516 | 1/1991 | Kluger et al. | 106/22 |
| 5,043,013 | 8/1991 | Kluger et al. | 106/22 |
| 5,071,648 | 12/1991 | Rosenblatt | 424/78.06 |

FOREIGN PATENT DOCUMENTS 5-9398  1/1993  Japan .

*Primary Examiner*—Robert Dawson
*Attorney, Agent, or Firm*—Terry T. Moyer; Timothy J. Monahan

[57] ABSTRACT

An aqueous composition of a poly(oxyalkylene) substituted chromogen, containing up to 30 wt. % water, is packaged in a water-soluble poly(vinyl alcohol) film.

20 Claims, 1 Drawing Sheet

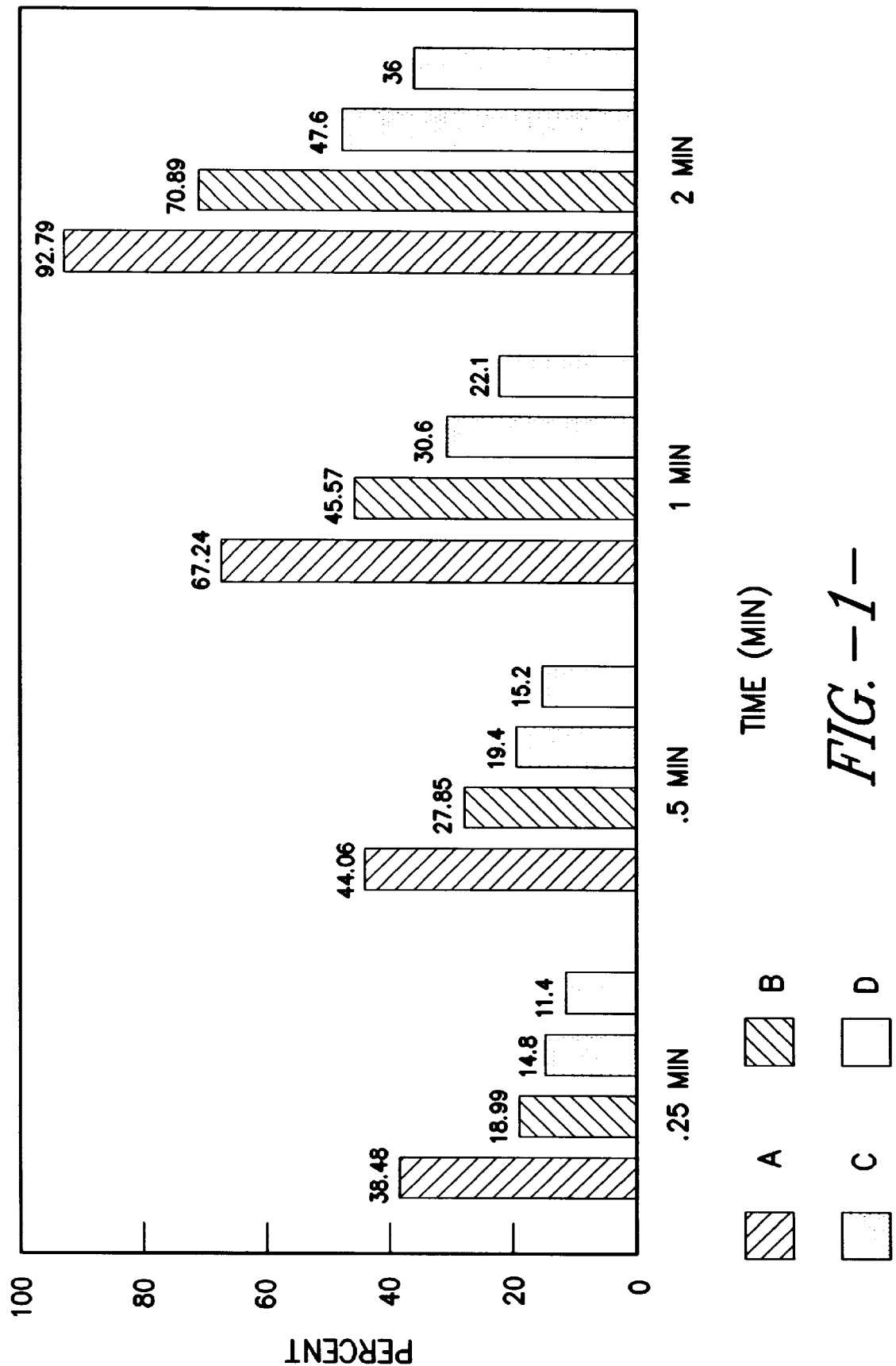
FIG. -1-

AQUEOUS COLORANT COMPOSITION IN WATER-SOLUBLE PACKAGE

BACKGROUND OF THE INVENTION

This invention relates to an aqueous colorant composition packaged in a water-soluble film, preferably a film of polyvinyl alcohol. The colorants are chromogens having a poly(oxyalkylene) substituent, which renders the colorant liquid, water-soluble and inhibits water present in the colorant composition from degrading the packaging film.

Colorants useful in the present invention, poly(oxyalkylene) substituted chromogens, and their synthesis are well known. Use of such colorants as fugitive tints for temporarily color coating textile fibers is disclosed in the following United States patents:

| INVENTOR | TITLE | U.S. PAT. NO. |
|---|---|---|
| Hauser et al. | Tint Compositions For Nylon Having Improved Fugitivity Properties | 4,144,028 |
| Brendle | Ester Capped Alkyleneoxy Fugitive Tints and Method For Producing Same | 4,167,510 |
| Keller et al. | Thiophene Based Fugitive Colorants | 4,601,725 |

These colorants are liquid at ambient temperature and, depending on the nature of the poly(oxyalkylene) substituent, e.g., the relative ethylene oxide to propylene oxide content, and terminal group, they can be made to be soluble or dispersible in a range of aqueous and oleophilic solvents. Examples of the versatility of these colorants are disclosed in the following United States patents:

| INVENTOR | TITLE | U.S. PAT. NO. |
|---|---|---|
| Hauser et al. | Water-Soluble, Non-Polar Solvent-Soluble Ethyleneoxy-Propyleneoxy containing Fugitive Tints | 4,113,721 |
| Kuhn | Liquid-Water-Insoluble Polymeric Colorants and Aqueous Dispersions Containing Same | 4,141,684 |
| Harris | Tint Compositions Useful For Providing Coloration To Aqueous and Non-Aqueous Liquids | 4,871,371 |

The poly(oxyalkylene) substituted chromogens have also been used in washable ink compositions as disclosed in the following patents:

| INVENTOR | TITLE | U.S. PAT. NO. |
|---|---|---|
| Kluger et al. | Methine Colorants And Washable Ink Compositions Containing Methine Colorants | 4,981,516 |
| Kluger et al. | Washable Ink Compositions | 5,043,013 |

All of the aforementioned United States patents are incorporated by reference.

Another application for these colorants has been as spray pattern indicators for the application of agricultural chemicals. For example, the colorant may be dissolved in an aqueous agricultural chemical solution and sprayed on turf grass; areas of application are identified by a visible tint. The colorant may be washed off the grass by rain or watering. Spray pattern indicators are sold by Milliken Chemical, a Division of Milliken & Company of Spartanburg, S.C. as colorant concentrates under the trademark BLAZON®. While these colorants have excellent fugitivity and are easy to clean up, it is, nevertheless desirable to avoid contact and handling of the colorant concentrate.

Poly(oxyalkylene) substituted chromogens may be conveniently manufactured in an aqueous solvent and the colorant composition can contain up to 30 wt. % water. It is desirable both from an energy savings and performance view point to retain a significant amount of water in the colorant composition; the water lowers the viscosity of the composition, which assists in the subsequent dispersion of the colorant.

Various approaches have been taken for employing water-soluble films to package aqueous compositions or other material which can have a deleterious effect on such films. For example, multiple layer films having a water-soluble outer layer and a water insoluble inner layer are disclosed in the following U.S. patents:

| INVENTOR | TITLE | U.S. PAT. NO. |
|---|---|---|
| Scheier | Container | 3,790,067 |
| Haq | Packaging Film and Packaging Of Detergent Compositions Therewith | 4,416,791 |

The outer layer dissolves when the package is placed in water causing the inner layer to weaken and release its contents.

Aggressive chemical compositions, especially alkaline and borate-containing detergents, have been stored in water-soluble polyvinyl alcohol films which are modified to include a nonhydrolizable comonomer, examples of which are disclosed in the following patents:

| INVENTOR | TITLE | U.S. PAT. NO. |
|---|---|---|
| Yang et al. | PVA Films With Nonhydrolizable Anionic Comonomers For Packaging Detergents | 4,747,976 |
| Yang et al. | Films From PVA Modified With Nonhydrolizable Anionic Comonomers | 4,885,105 |

Kennedy, U.S. Pat. No. 4,973,416, discloses an aqueous liquid laundry detergent packaged in a water-soluble film, preferably polyvinyl alcohol. The detergent comprises about 10 to 24 wt. % water and an organic neutralization system, such as an alkanolamine. The detergent also may contain a surfactant, a builder and a solvent system, for example, ethanol and propylene glycol. The water-soluble film maintains its integrity due to the critical level of water in the liquid laundry detergent and incorporation of the neutralization system.

Gelatin capsules filled with aqueous solutions containing "more than 10% water" are prepared in Kreuger, U.S. Pat. No. 2,580,683, by incorporating a hygroscopic material, such as dextrins, pectins or calcium or magnesium salts, into the solution. Griffin, U.S. Pat. No. 2,667,268, discloses gelatin capsules filled with an aqueous solution containing as much as 25% or more water by incorporating from 50 to 95% of an inhibitor, such as a poly(oxyalkylene) ether of an aliphatic polyol. Finally, water-soluble chemicals are provided in a gelatin capsule by Palermo et al., U.S. Pat. No. 2,780,355, by dissolving the water-soluble chemical in a liquid water-soluble hygroscopic organic liquid containing from 60 to 40 units of ethylene oxide per molecule, such as polyethylene glycols or fatty esters of polyethylene glycols.

The aforementioned approaches all have the disadvantage of requiring specialty films or additives to prevent the premature deterioration of the packaging.

SUMMARY OF THE INVENTION

Therefore, one of the objects of the present invention is to provide an aqueous colorant composition which is packaged in a water-soluble film.

Another object is to provide a composition which may contain up to 30 wt. % water.

Another object is to provide a colorant composition which does not require hygroscopic additives to inhibit the interaction of the water with the film.

Another object of the invention is to employ a water-soluble film, which is a staple item.

Still another object of the invention is to provide a low viscosity aqueous colorant composition.

Accordingly, an article is provided having an aqueous composition of a poly(oxyalkylene) substituted chromogen containing from 5 to 30 parts water, preferably 7 to 25 parts water, packaged in a water-soluble film. The film is preferably made of poly(vinyl alcohol) and has a thickness of 1–6 mils.

The invention features poly(oxyalkylene) substituted chromogens, which have the advantage of being water-soluble and fugitive, and, surprisingly, also inhibit the water from degrading the packaging film. Consequently, the addition of hygroscopic chemicals is not required, which has the further advantage of (1) minimizing cost; (2) allowing the colorant to be provided at optimum color strength; and (3) minimizing the viscosity of the composition.

The invention may be practiced with cold water-soluble films, particularly cold water-soluble PVA film.

A preferred feature of the invention includes leaving sufficient air in the package to make the package buoyant in water, thus aiding in dispersion of the colorant as the package dissolves.

BRIEF DESCRIPTION OF THE DRAWINGS

FIG. 1 is a graphical representation of the dissolution rate of four different aqueous colorant compositions.

DESCRIPTION OF THE PREFERRED EMBODIMENT OF THE INVENTION

Without limiting the scope of the invention, the preferred features of the invention are hereinafter set forth.

The present invention is an aqueous composition containing a poly(oxyalkylene) substituted chromogen (colorant) in a water-soluble film. The package is especially useful for administering uniform measures of the colorant as a spray pattern indicator in agricultural chemicals. For example, the package is placed in a vessel containing an aqueous agricultural chemical solution, the film dissolves and the colorant is released and dispersed throughout the chemical solution. Because many applications of the invention involve field use, where the agricultural chemical is at or below ambient temperature, it is desirable to select a film which is water-soluble over a wide range of temperatures.

The term "film" is used to characterize a flat, continuous section of a resin which is very thin in relation to its length and breadth, typically having a thickness of 10 mils or less.

A wide variety of water-soluble films, both cold water and hot water-soluble types, may be employed in the present invention. Water-soluble films of particular interest are those made from poly(vinyl alcohol), referred to herein as PVA. It is produced by the hydrolysis of poly(vinyl acetate) and its manufacture is well known. PVA is readily available commercially in a variety of grades. Its properties vary according to molecular weight and degree of hydrolysis.

For field applications, it is especially desirable to provide film that is both cold and hot water-soluble, usually referred to as partially hydrolyzed PVA. By way of example, PVA which is 85 to 90% hydrolyzed can be employed to advantage. Minor amounts of copolymer or grafted material may be added to the PVA film to modify its properties, although not necessary.

Films having a thickness of 1 to 6 mils have been found to meet the requirements of durability and solubility in water, with thicknesses of 2 to 4 mils being preferred. It is also within the scope of the invention to meet the aforementioned thickness parameters with multiple layers of or laminated water-soluble films. For example, the package wall may be made of two layers of PVA film, each having a thickness of 1.5 mils (3 mils total thickness). The advantage of multiple layers is that a defect in one layer of film will not result in a failure of the package.

Useful colorants may be characterized as organic chromogens having a poly(oxyalkylene) substituent. Any of a variety of chromogens may be employed, for example those organic chromogens classified as nitroso, nitro, azo, including monoazo, disazo and trisazo, diphenylmethane, triarylmethane, xanthene, methine, thiozol, indamine, indophenol, azine, oxazine, anthraquinone and phthalocyanine. Of particular interest are the azo, diphenylmethane, triarylmethane, methine, thiozol, anthraquinone and phthalocyanine chromogens.

The manufacture of these chromogens with one or more poly(oxyalkylene) substituents is disclosed in detail in the patents referenced herein, and is well known in the art. For example, the poly(oxyalkylene) substituent may be covalently bonded to the chromogen through an amino, oxy, sulfonamide, thio, sulfonyl and amido. A number of poly(oxyalkylene) substituted chromogens are available from Milliken Chemical, a Division of Milliken & Company, Spartanburg, S.C.

The colorants of the present invention will generally constitute a chromogen having from 1 to 6 poly(oxyalkylene) substituents, usually from 1 to 4, made up primarily of ethylene oxide and propylene oxide residues. Minor amounts of glycidol and butylene oxide residues may be included, without deviating from the practice of the invention. The total number of alkylene oxide residues per colorant molecule ranges from 4 to 250, preferably 8 to 100, with 16 to 60 representing an optimum for fugitivity, viscosity and color strength.

The identity of the terminal group of the poly(oxyalkylene) substituent is not critical, but will have some influence on solubility of the colorant as disclosed in U.S. Pat. No. 4,167,510. By way of example, the terminal group may be hydroxy, amino, thio, or an acid ester group containing up to 20 carbon atoms.

Without being bound to a particular theory, it is believed that selection of a poly(oxyalkylene) substituted chromogen provides a polyether functionality in the aqueous composition which inhibits the solvent activity of water on the PVA film. Selection of a poly(oxyalkylene) substituted chromogen provides all of the benefits of such colorant, i.e., water-solubility, fugitivity and liquidity, without the requirement that the colorant composition be water free or contain hygroscopic additives to inhibit an aqueous solvent from dissolving the packaging film. It has been found that the aqueous colorant composition may contain up to 30 wt. % water, without impairing the integrity of the water-soluble film.

Accordingly, aqueous colorant compositions are provided having from:
  70–95 parts of a poly(oxyalkylene) substituted chromogen; and
  5–30 parts water;
Preferably, the composition contains
  75–93 parts of a poly(oxyalkylene) substituted chromogen; and
  7–25 parts water.

An important consideration in formulating the colorant composition, in addition to protecting the package from internal degradation and maximizing color strength, is to minimize the viscosity of the composition to promote dispersion of the colorant into the material to be colored. Thus, an organic, water-miscible diluent may be added to the composition to decrease the viscosity, while providing a margin of safety against dissolution of the packaging films from additional water. Suitable diluents include, by way of example and not limitation, $C_{2-3}$ alcohols, ethylene glycol, propylene glycol, glycerol, polyethylene glycol and polypropylene glycol. The preferred diluents are $C_3$ alcohols, ethylene glycol, propylene glycol and glycerol.

Nevertheless, it is desirable to retain a substantial portion of water in the formulation, both from the view point of economics, i.e., less water has to be removed from the colorant after synthesis and less organic diluent is required, and for minimizing viscosity. Viscosities in the range of 25 to 7,500 centipoise, preferably 100 to 3,000 centipoise are desirable for ease of dispersion of the composition.

Compositions which include a diluent may be provided which have the following components:
  50–95 parts of a poly(oxyalkylene) substituted chromogen;
  5–30 parts water; and
  Up to 30 parts of a water miscible, organic diluent;
wherein the composition does not exceed 30 wt. % water.

In a preferred embodiment, the diluted composition has from:
  65–90 parts of a poly(oxyalkylene) substituted chromogen;
  5–25 parts water; and
  5–25 parts of a water miscible, organic diluent;
wherein the composition does not exceed 25 wt. % water.

Packaging the aqueous colorant composition in a water-soluble film is accomplished by conventional techniques. Examples of useful packaging equipment include a belt drive unit with resistive heat seals such as Model No. CMV80, available from Hayssen Manufacturing Company, Sheboygan, Wis., and a reciprocating drive unit with impulse heat seals, Model No. 80-P, available from General Packaging Equipment Company, Houston, Tex. Convenient package sizes have been found to be in the 2–3 fluid ounce range.

In a preferred embodiment, the package is sealed with a small amount of air, so that the package has a specific gravity of less than 1 and will float in a tank of an aqueous, liquid material to be colored. Better dispersion of the colorant, which has a specific gravity of approximately 1.2, is realized if the colorant is at or near the surface when the package dissolves. Conversely, dispersion of the colorant is retarded if the relatively heavier colorant is at the bottom of a tank of liquid material when the package is dissolved.

The invention may be further understood by reference to the following examples, but the invention is not to be construed as being unduly limited thereby. Unless otherwise indicated, all parts and percentages are by weight.

EXAMPLE 1

Various blends of the aqueous colorant composition of the present invention, both with and without a water-miscible organic solvent included, were packaged in poly(vinyl alcohol) film, and the stability of the film was observed.

The poly(oxyalkylene) substituted chromogen (colorant) used was a triphenyl methane compound having the structure:

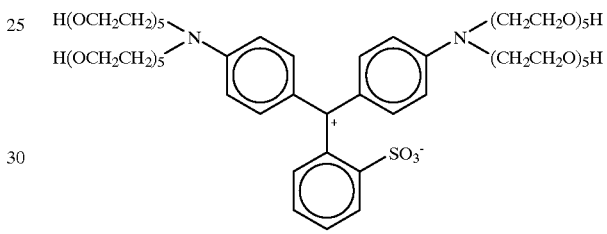

The colorant was synthesized using an N,N-bis(hydroxyethyl poly(oxyalkylene)) aniline intermediate prepared by bubbling 352 g of ethylene oxide into 181 g of N,N-dihydroxyethyl aniline in the presence of potassium hydroxide catalyst following well known ethoxylation procedures. The mixture was allowed to react until a theoretical ratio of 1 mole of aniline to 10 moles of ethylene oxide was achieved.

A mixture of 579 g of the intermediate, 107.4 g of ortho-formyl benzene sulfonic acid, 75.6 g of muriatic acid and 11.5 g of urea were condensed at 100° C. for three hours. The condensate was oxidized at 100° C. using a mixture of 110 g of 35% hydrogen peroxide and long of water. The resulting colorant was concentrated by stripping off water to achieve the desired color strength.

The colorant composition was adjusted by adding water, or water and a water-miscible organic solvent to make compositions a–h shown in Table 1 below.

TABLE 1

| Sample | Wt. % Colorant | Wt. % Water | Wt. % Water Miscible Organic Solvent |
|---|---|---|---|
| a | 60% | 40% | — |
| b | 70% | 30% | — |
| c | 80% | 20% | — |
| d | 80% | 10% | 10% PG |
| e | 80% | 10% | 10% I |
| f | 80% | 10% | 10% NP |
| g | 80% | 10% | 10% M |
| h | 80% | 10% | 10% E |

PG = PROPYLENE GLYGOL

TABLE 1-continued

| Sample | Wt. % Colorant | Wt. % Water | Wt. % Water Miscible Organic Solvent |
|---|---|---|---|

I = ISOPROPYL ALCOHOL
NP = N-PROPANOL
M = METHANOL
E = ETHANOL

Approximately 2.3 fluid ounces of each composition was packaged in three different poly(vinyl alcohol) films, each film having a thickness of 3 mils. The films used were (1) Armor H-20, available from Chase Packaging, Old Greenwich, Conn.; (2) Product L.337H, available from Aquafilm Incorporated, Wilson, N.C.; and Monosol M-7030, available from Chris-Craft, Industrial Products, Inc., Gary, Ind. The packages, compositions a-h each in three different PVA films, were placed in an oven at 140° F. for 24 hours and observed for signs of deterioration, i.e., elasticity, brittleness, leaks, thinning, swelling and other signs of weakness. The packages were graded pass/fail. The results are summarized below in Table 2.

TABLE 2

| Sample | Armor H-20 | L.337H | Monosol M-7030 |
|---|---|---|---|
| a | fail | fail | fail |
| b | pass | pass | pass |
| c | pass | pass | pass |
| d | pass | pass | pass |
| e | pass | pass | pass |
| f | pass | pass | pass |
| g | pass | pass | pass |
| h | pass | pass | pass |

EXAMPLE 2

The dissolution rates of various aqueous colorant compositions were measured. Four different compositions were prepared using the colorant of Example 1 in water, water and propylene glycol or propylene glycol only. The compositions are identified as A-D, summarized in Table 3 below.

TABLE 3

| Sample | Wt. % Colorant | Wt. % Water | Wt. % Propylene Glycol |
|---|---|---|---|
| A | 70 | 30 | — |
| B | 70 | 15 | 15 |
| C | 70 | — | 30 |
| D | 80 | 20 | — |

The dissolution rate was tested by adding 1.5 g of the composition to be tested to 960 g of water at 25° C. in a 2 liter beaker. Immediately after addition of the colorant composition, the agitator was started and maintained at low speed. Samples were drawn out of the beaker at 0.25, 0.5, 1.0 and 2.0 minutes and the color strength was compared to the theoretical color strength which would have been obtained if all of the colorant was dispersed in the water. Referring to FIG. 1, the results are presented on a graph of the percent of colorant dissolved versus time.

This example indicates that at a 70 wt. % colorant concentration, water is the best diluent and that the dissolution rate decreases substantially as water is replaced with propylene glycol. The colorant itself is very viscous and the dissolution rate at an 80 wt. % colorant concentration in water is slower than 70 wt. % colorant in propylene glycol.

There are, of course, many alternate embodiments and modifications which are intended to be included within the scope of the following claims.

What we claim is:

1. An article comprising:
   (a) an aqueous composition of from 70–95 parts of a poly(oxyalkylene) substituted chromogen and from 5–30 parts water; and
   (b) a water-soluble film containing said composition.

2. The article of claim 1 wherein said water-soluble film is a 1–6 mil. thick poly(vinyl alcohol) film.

3. The article of claim 2 wherein said poly(oxyalkylene) substituted chromogen comprises from 4 to 250 ethylene oxide and propylene oxide residues.

4. The article of claim 3 wherein said aqueous composition has a viscosity of from 25 to 7,500 cps.

5. The article of claim 3 wherein said poly(vinyl alcohol) film is between 2–4 mils thick.

6. The article of claim 3 wherein said article has a specific gravity less than 1.

7. The article of claim 2 wherein said poly(oxyalkylene) substituted chromogen comprises from 16 to 60 ethylene oxide and propylene oxide residues.

8. The article of claim 2 wherein said aqueous composition comprises from 75 to 93 parts of said poly(oxyalkylene) substituted chromogen and from 7 to 25 parts water.

9. The article of claim 8 wherein said aqueous composition has a viscosity of from 100 to 3,000 cps.

10. The article of claim 9 wherein said poly(oxyalkylene) substituted chromogen comprises from 16 to 60 ethylene oxide and propylene oxide residues.

11. An article comprising:
    (a) an aqueous composition of from
       i. 50–95 parts of a poly(oxyalkylene) substituted chromogen;
       ii. 5–30 parts water;
       iii. up to 30 parts of a water miscible organic diluent; wherein said composition does not exceed 30 wt. % water; and
    (b) a 1–6 mil. thick, cold water-soluble poly(vinyl alcohol) film.

12. The article of claim 11 wherein said diluent of said aqueous composition is selected from the group consisting of $C_2$–$C_3$ alcohols, ethylene glycol, propylene glycol, glycerol, polyethylene glycol, and polypropylene glycol.

13. The article of claim 12 wherein said poly(oxyalkylene) substituted chromogen comprises from 4 to 250 ethylene oxide and propylene oxide residues.

14. The article of claim 12 wherein said poly(oxyalkylene) substituted chromogen comprises from 16 to 60 ethylene oxide and propylene oxide residues.

15. The article of claim 11 wherein said poly(oxyalkylene) substituted chromogen comprises from 8 to 100 ethylene oxide and propylene oxide residues.

16. The article of claim 15 wherein said diluent is selected from the group consisting of $C_3$ alcohols, ethylene glycol, propylene glycol and glycerol.

17. The article of claim 16 wherein said aqueous composition has a viscosity of from 25 to 7,500 cps.

18. An article comprising:
    (a) an aqueous composition of from
       i. 65 to 90 parts of a poly(oxyalkylene) substituted chromogen having from 8 to 100 ethylene oxide and propylene oxide residues;
       ii. 5–25 parts water;

iii. 5–25 parts of a diluent selected from the group consisting of $C_2$–$C_3$ alcohols, ethylene glycol, propylene glycol, glycerol, polyethylene glycol, and polypropylene glycol;

wherein said composition does not exceed 25 wt. % water;

(b) a 1–6 mil. thick, cold water-soluble poly(vinyl alcohol) film containing said composition.

19. The article of claim 18 wherein said diluent is selected from the group consisting of $C_3$ alcohols, ethylene glycol, propylene glycol and glycerol and said aqueous composition has a viscosity of from 100 to 3,000 cps.

20. The article of claim 19 wherein said poly(oxyalkylene) substituted chromogen comprises a triphenylmethane chromogen.

* * * * *